United States Patent [19]

Reddig et al.

[11] Patent Number: 5,538,518

[45] Date of Patent: Jul. 23, 1996

[54] DYEING OH- OR AMIDO-CONTAINING MATERIALS WITH REACTIVE DYESTUFFS CONTAINING A DIFLUOROPYRIMIDINE RADICAL

[75] Inventors: Wolfram Reddig, Bergisch Gladbach 1; Karl-Josef Herd, Odenthal-Holz, both of Germany

[73] Assignee: Bayer Aktiengesellschaft, Leverkusen, Germany

[21] Appl. No.: 422,977

[22] Filed: Apr. 17, 1995

Related U.S. Application Data

[62] Division of Ser. No. 917,881, Jul. 23, 1992, Pat. No. 5,436,324.

[30] Foreign Application Priority Data

Aug. 3, 1991 [DE] Germany .............. 41 25 754.4

[51] Int. Cl.$^6$ .............. D06P 1/382; D06P 1/38; D06P 1/304; D06P 3/66; D06P 3/10
[52] U.S. Cl. ................................. 8/549; 8/543
[58] Field of Search .................. 534/528, 529, 534/53, 532, 536, 537, 525; 8/549, 543

[56] References Cited

U.S. PATENT DOCUMENTS

| | | | |
|---|---|---|---|
| 3,669,951 | 6/1972 | Bien et al. | 534/638 X |
| 3,910,758 | 10/1975 | Bien et al. | 534/630 X |
| 4,007,164 | 2/1977 | Bien et al. | 534/638 X |
| 4,065,446 | 12/1977 | Bien et al. | 534/632 X |

FOREIGN PATENT DOCUMENTS

| | | | |
|---|---|---|---|
| 0065479 | 11/1982 | European Pat. Off. | |
| 1809388 | 6/1970 | Germany | 534/638 |
| 2019867 | 7/1979 | United Kingdom | |

OTHER PUBLICATIONS

Sietz et al, Chemical Abstracts, 96:201258, (1982).
Dyes And Pigments, vol. 14, No. 4, 1990, pp. 239–263, Barking, Essex, GB; F. Lehr: "Synthesis and Application of Reactive Dyes with Heterocyclic Reactive Systems".

*Primary Examiner*—Floyd D. Higel
*Attorney, Agent, or Firm*—Sprung Horn Kramer & Woods

[57] ABSTRACT

Dyeing and printing of natural or synthetic OH— and/or amido-containing materials, in particular, those made of cotton and polyamides, with reactive dyestuffs which in the form of the free acid are of the formula

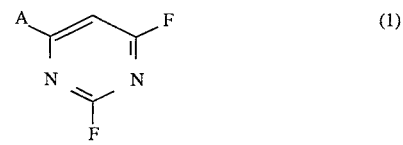

wherein A is a chromophoric radical.

6 Claims, No Drawings

DYEING OH- OR AMIDO-CONTAINING MATERIALS WITH REACTIVE DYESTUFFS CONTAINING A DIFLUOROPYRIMIDINE RADICAL

This is a division of application Ser. No. 07/917,881, filed on Jul. 23, 1992 now U.S. Pat. No. 5,436,324.

The invention relates to reactive dyestuffs containing a difluoropyrimidine radical.

Although reactive radicals of this type have already been disclosed in German Auslegeschrift 1,644,204 (U.S. Pat. No. 3,669,951) and DE-A-2,114,158 (U.S. Pat. No. 4,065,446), some of them still have problems in practical application.

Furthermore, reactive dyestuffs containing other reactive groups and various chromophores have already been disclosed in EP-A 45,278 and EP-A 65,479 and in German Offenlegungsschrift 2,817,780. These dyestuffs too still need to be improved.

The present invention relates to reactive dyestuffs which, in the form of the free acid, have the formula

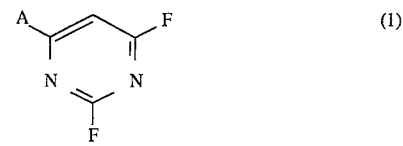

(1)

in which

A is a chromophoric radical of one of the following structures

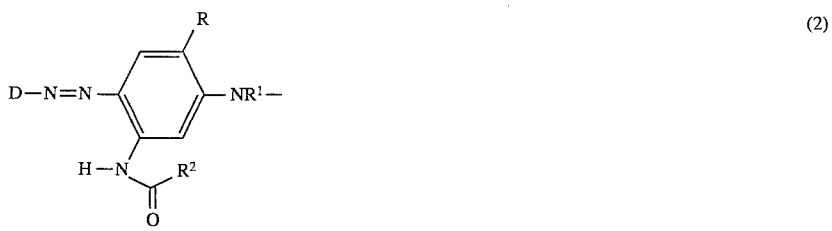

(2)

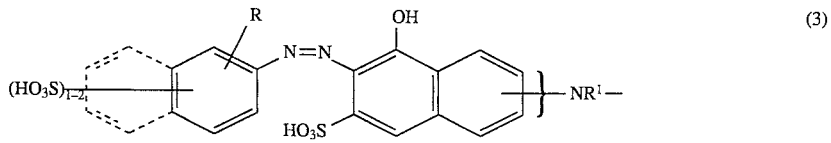

(3)

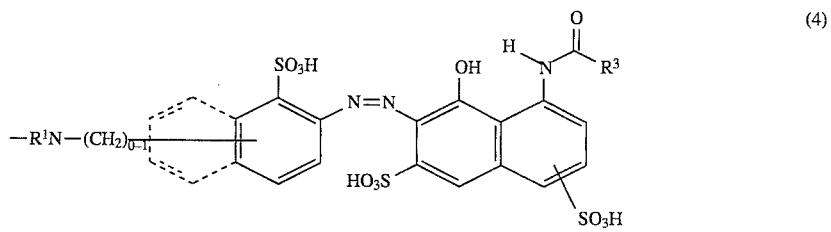

(4)

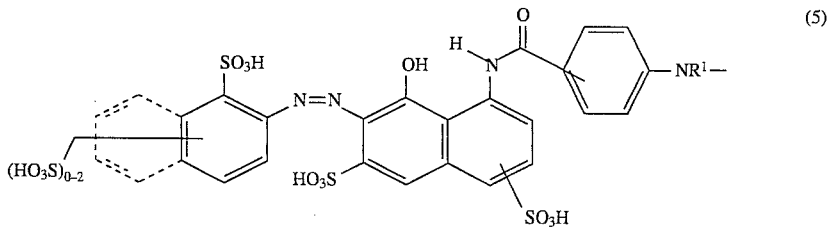

(5)

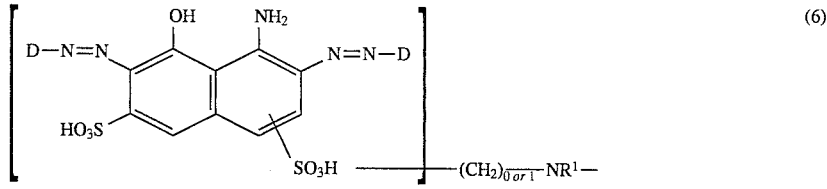

(6)

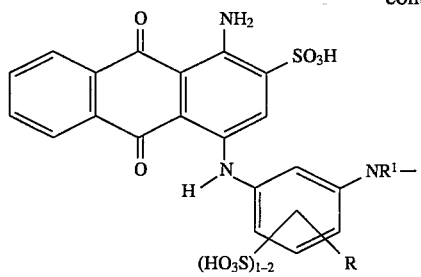
(7)
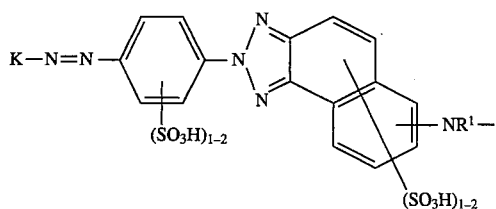
(12)
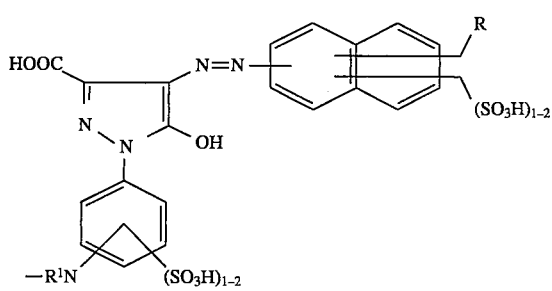
(13)
or
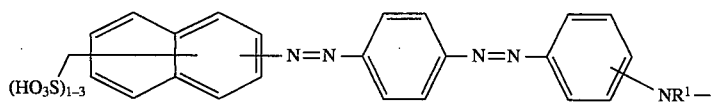
(14)
or metal complexes of dyestuffs of the formulae (8)–(11)
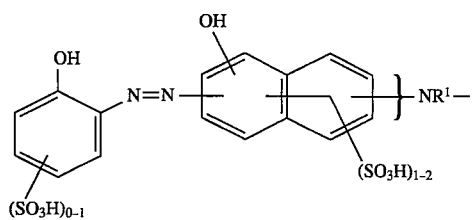
(8)
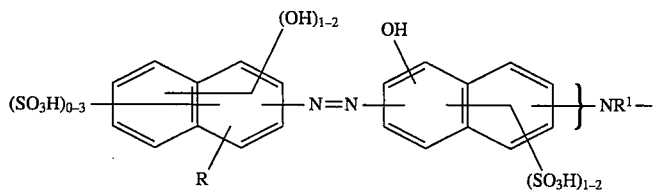
(9)
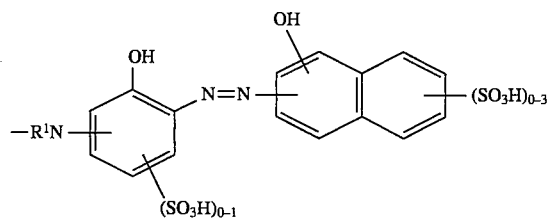
(10)

$$\text{(11)}$$

in which
the bond between the chromophoric radical A and the 4-pyrimidinyl radical is effected via an amino or aminomethyl function on a ring C atom and A,
in which
R denotes H, a $C_1$–$C_6$-alkyl radical, a $C_1$–$C_6$-alkoxy radical, $R^1$ denotes H, $CH_3$, $C_2H_5$, $R^2$ denotes $NH_2$, a $C_1$–$C_4$-alkyl radical which is unsubstituted or substituted by OH, $SO_3H$, $OSO_3H$ or $CO_2H$, a $C_1$–$C_4$-alkoxy radical which is unsubstituted or substituted by OH, $SO_3H$, $OSO_3H$ or $CO_2H$, $R^3$ denotes a $C_1$–$C_4$-alkyl radical which is unsubstituted or substituted by OH, $SO_3H$, $OSO_3H$ or $CO_2H$, a phenyl radical which is unsubstituted or substituted by $C_1$–$C_4$-alkyl, halogen or $SO_3H$, D represents a sulpho- or carboxy-containing radical of a diazo component from the benzene, naphthalene or hetaryl series, which additionally may be substituted by alkyl, alkoxy, carboxyl or halogen radicals, but in formula (6) one of the two radicals D contains an optionally substituted 2,6-difluoro-4-pyrimidinylamino, -methylamino or -ethylamino substituent, it being possible in this case for D to be free of sulpho groups or to contain sulpho groups.

K represents a coupling component, preferably pyridones, pyrazolones, barbituric acid and citrazinic acid derivatives,
with the exception of compounds 15 and 16

$$\text{(15)}$$

$$\text{(16)}$$

which are described by F. Lehr in Dyes +Pigments 14 (1990), 239–63.

In a preferred embodiment, in the case of the metal complex dyestuffs, Cu (1:1 complex) or Cr and Co (1:2 complex) are preferred. Cr complexes and Co complexes can contain the azo compound of the abovementioned formula once or twice, i.e. they can have a symmetrical structure or, together with any desired other ligand groups, an unsymmetrical structure.

In a further preferred embodiment, the dyestuffs are present as salts, in particular as alkali metal salts or ammonium salts.

Formulae (2) to (14) show the sulpho-containing dyestuff in the form of the free acids. During preparation, the salts are in general obtained, in particular the alkali metal salts, such as sodium salts, potassium salts or lithium salts. However, the dyestuffs can also be used as concentrated solutions.

Preference is given to dyestuffs of the formula (I) where A is a radical of the formulae (2)–(12) in which R is H, $CH_3$, $OCH_3$, $OC_2H_5$, $R^1$ is H, $CH_3$, $R^2$ is $NH_2$, a $C_1$–$C_4$-alkyl radical which is unsubstituted or substituted by OH, $SO_3H$, $OSO_3H$ or $CO_2H$, $R^3$ is $CH_3$, a phenyl radical which is unsubstituted or substituted by $C_1$–$C_4$-alkyl, halogen or $SO_3H$.

Very particular preference is given to a) Dyestuffs of the formula (1) where A is a radical of the formula (2) in which
R is H,
$R^1$ is H, $CH_3$,
$R^2$ is $NH_2$, a $C_1$–$C_4$-alkyl radical which is unsubstituted or substituted by OH, $SO_3H$, $OSO_3H$ or $CO_2H$, and
D is b) Dyestuffs of the formula (1) where A is a radical of the formula (3) in which
R is H, $CH_3$, $OC_2H_5$,
$R^1$ is H, $CH_3$.

c) Dyestuffs of the formula (1) where A is a radical of the formulae (4)–(5) in which
$R^1$ is H, $CH_3$,
$R^3$ is $CH_3$, a phenyl radical which is unsubstituted or substituted by $C_1$–$C_4$-alkyl, halogen or $SO_3H$.

d) Dyestuffs of the formula (1) where A is a radical of the formula $$\text{(17)}$$

in which

D is

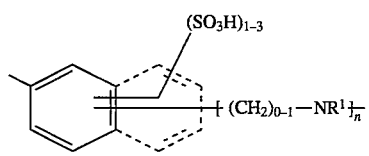

$D^1$ is

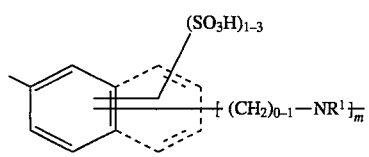

$R^1$ is H, $CH_3$,
n=m is 0 or 1 but n+m is 1.

e) Dyestuffs of the formula (1) where A is a radical of the formula

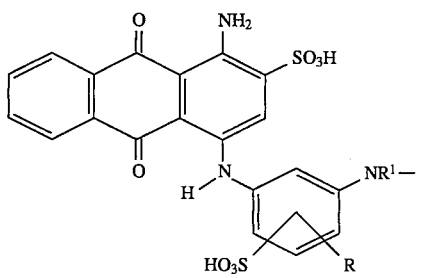

in which
R is H, $CH_3$, $OCH_3$,
$R^1$ is H.

f) Dyestuffs of the formula (1) where A is a radical of the formulae (8) to (11), in which
R is H.

g) Dyestuffs of the formula (1) where A is a radical of the formula (12), in which
R is H and
K has the abovementioned meaning.

The preparation of the dyestuffs (1) is carried out, for example, by the following processes:

1. By condensation of a reactive component of the formula

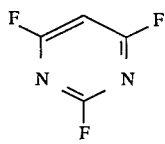

with the corresponding dyestuff bases.

2. By azo coupling of a condensation product of the formulae

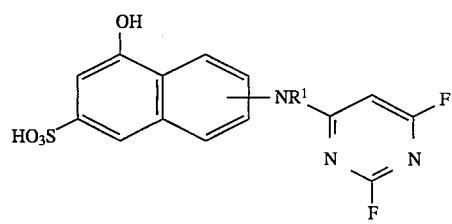

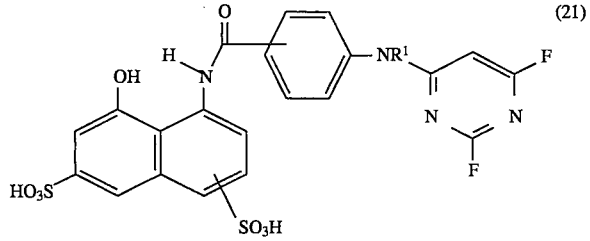

with diazonium compounds, which may be obtained from the amines of the general formula

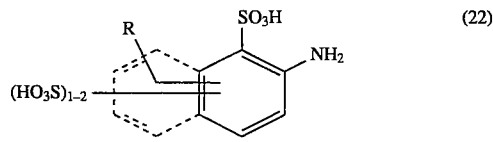

in which R and $R^1$ have the meaning given, in the usual manner;

3. By diazotisation and coupling of an amine of the general formula

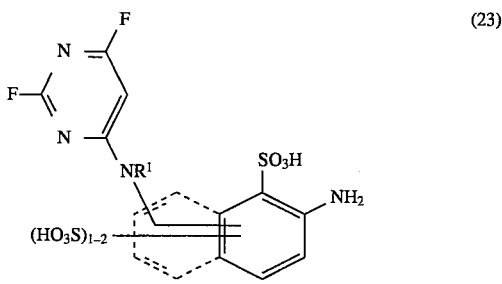

condensed with 2,4,6-trifluoropyrimidine onto a coupling component of the formula

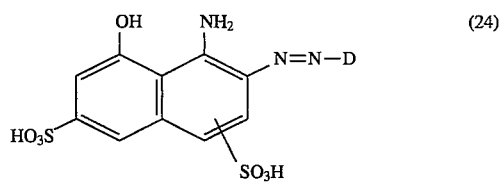

in which D has the abovementioned meaning.

The reactive component 2,4,6-trifluoropyrimidine is known from German Auslegeschrift 2,114,158 (U.S. Pat. No. 4,065,446) and can be obtained, for example, from 2,4,6-trichloropyrimidine by fluoride exchange using HF or alkali metal fluorides in aprotic solvents.

The dyestuffs according to the invention are highly suitable for the dyeing and printing of natural or synthetic OH— and/or amido-containing materials, in particular those made of cellulose and polyamides. They are particularly suitable for the dyeing of cellulose materials by the exhaust and cold pad-batch method and for the printing of cellulose materials, such as cotton or staple viscose.

When mixed with other dyestuffs, the dyestuffs can be used for trichromatic dyeing.

Dyeings having good general fastness properties, in particular wet fastness properties, in combination with good build-up properties and high fixation yields are obtained.

EXAMPLE 1

23.6 g of 7-amino-1,3-naphthalenedisulphonic acid monosodium salt are stirred in 150 ml of water/30 g of ice and 20 ml of concentrated hydrochloric acid, and 17 ml of an aqueous sodium nitrite solution (300 g of $NaNO_2/l$) are added dropwise at 5°–10° C. After stirring at 5°–10° C. for one hour, excess nitrous acid is removed using sulphamic acid.

This cream-coloured suspension is then metered into a neutral solution of the coupling component prepared from 13.5 g of N-(3-aminophenyl)-acetamide hydrochloride, 50 ml of water, 50 g of ice and about 30 ml of a 10% strength aqueous lithiumhydroxide solution over a period of 30 minutes. During this addition, the pH of the reaction mixture is kept constant at 6.0 to 6.5 with 20% aqueous potassium bicarbonate solution. If possible, the temperature should not exceed 10° C. After addition is complete, stirring is continued for another 30 minutes, during which the pH is still kept constant.

The coupling solution is warmed to 40° C., and 12 g of 2,4,6-trifluoropyrimidine are added. During the condensation reaction, the pH is kept constant at 5.8–6.2 with lithium hydroxide solution. After 3 hours, hardly any more change in the pH can be observed, and the condensation, according to TLC analysis, is complete. The dye-stuff solution is clarified in order to separate off insoluble components, such as lithium fluoride, and salted out with 50 g of sodium chloride. The precipitated dyestuff is filtered off with suction and dried, giving 40 g of an orange-red powder ($\lambda max$= 395.2 nm ($H_2O$)), which has the structure

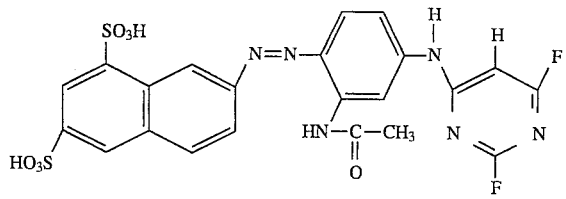

and dyes cotton in golden yellow hues having excellent fastness properties.

By varying the diazo component D—$NH_2$ and the coupling component containing R, $R^1$ and $R^2$, further valuable golden yellow reactive dyestuffs of the formula

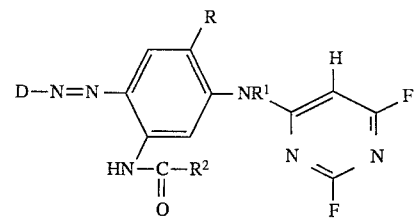

which are listed in the table below, are available analogously to Example 1.

TABLE 1

| Ex. | D | R | $R^1$ | $R^2$ | $\lambda max$ ($H_2O$) |
|---|---|---|---|---|---|
| 2 | ![SO3H naphthalene with HO3S] | H | H | $NH_2$ | |
| 3 | " | H | H | $C_2H_5$ | |
| 4 | " | H | H | $CH_2$—OH | |
| 5 | " | H | H | $CH_2$—$OSO_3H$ | |
| 6 | " | H | H | $CH_2$—$CH_2$—COOH | |
| 7 | " | $CH_3$ | H | $NH_2$ | |
| 8 | " | H | $CH_3$ | $NH_2$ | |
| 9 | " | H | $C_2H_5$ | $NH_2$ | |
| 10 | " | H | $C_2H_5$ | $CH_3$ | |
| 11 | ![SO3H benzene with HO3S] | H | H | $NH_2$ | 406 nm |
| 12 | " | H | H | $CH_3$ | |
| 13 | " | H | H | $C_2H_5$ | |
| 14 | " | H | H | $CH_2$—OH | |
| 15 | " | H | H | $CH_2$—$OSO_3H$ | |
| 16 | " | H | H | $CH_2$—$CH_2$—COOH | |
| 17 | " | $CH_3$ | H | $NH_2$ | |
| 18 | " | H | $CH_3$ | $NH_2$ | |
| 19 | " | H | $C_2H_5$ | $NH_2$ | |
| 20 | " | H | $C_2H_5$ | $CH_3$ | |
| 21 | ![SO3H naphthalene with HO3S and SO3H] | H | H | $NH_2$ | 420 nm |
| 22 | " | H | H | $CH_3$ | 401 nm |

TABLE 1-continued

| Ex. | D | R | $R^1$ | $R^2$ | λmax ($H_2O$) |
|---|---|---|---|---|---|
| 23 | " | H | H | $C_2H_5$ | |
| 24 | " | H | H | $CH_2OH$ | |
| 25 | " | H | H | $CH_2-OSO_3H$ | |
| 26 | " | H | H | $CH_2-CH_2-COOH$ | |
| 27 | " | $CH_3$ | H | $NH_2$ | |
| 28 | " | H | $CH_3$ | $NH_2$ | |
| 29 | " | H | $C_2H_5$ | $NH_2$ | |
| 30 | " | H | $C_2H_5$ | $CH_3$ | |
| 31 | ![naphthalene with SO3H groups] | H | H | $NH_2$ | |
| 32 | " | H | H | $C_2H_5$ | |
| 33 | " | H | H | $CH_2-OH$ | |
| 34 | " | H | H | $CH_2-OSO_3H$ | |
| 35 | " | H | H | $CH_2-CH_2-COOH$ | |
| 36 | " | $CH_3$ | H | $NH_2$ | |
| 37 | " | H | $CH_3$ | $NH_2$ | |
| 38 | " | H | $C_2H_5$ | $NH_2$ | |
| 39 | " | H | $C_2H_5$ | $CH_3$ | |

EXAMPLE 40

10.4 g of 7-amino-4-hydroxy-2-naphthalenesulphonic acid are dissolved in 150 ml of water at a pH of 7 using lithiumhydroxide. 7.6 g of 2,4,6-trifluoropyrimidine are added, the reaction mixture is heated to 40° C. and the pH is maintained at the same time at 6.5 with lithium carbonate solution. After stirring for 3 hours, the mixture is cooled to 10° C. and, while maintaining the pH at 6.5 with lithium carbonate solution, a suspension of 14.1 g of diazotised 1,5-naphthalenesulphonic acid are added. After 1 hour, azo coupling is complete, and the dyestuff is salted out, isolated and dried; it has the formula

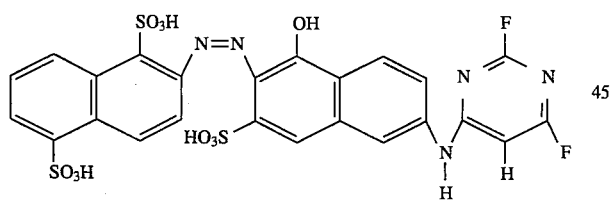

(λmax=485 nm ($H_2O$)) and dyes cotton in brilliant orange shades having very good wet fastness properties.

A further method to prepare the dyestuff from Example 40 consists in condensing the azo dyestuff of the formula

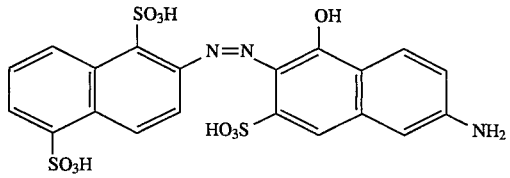

with 2,4,6-trifluoropyrimidine at a pH of 6.5–7.5.

By varying the diazo component D—$NH_2$ and the coupling component $K^1H_2$, the dyestuffs of the general formula

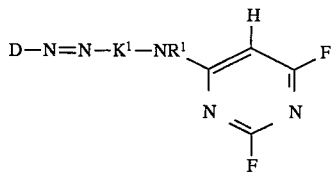

listed in the table below, which dye cotton in the hues mentioned, can be prepared analogously to Example 40.

TABLE 2

| Ex. | D | $K^1$ | $R^1$ | Hue λmax ($H_2O$) |
|---|---|---|---|---|
| 41 | ![naphthalene D group] | ![K1 group] | H | orange |

TABLE 2-continued

| Ex. | D | K¹ | R¹ | Hue λmax (H₂O) |
|---|---|---|---|---|
| 42 | 2-SO₃H, 5-OC₂H₅ phenyl | " | H | yellowish red |
| 43 | 2-SO₃H, 4-SO₃H, 5-OCH₃ phenyl | " | H | orange |
| 44 | 2-SO₃H, 5-CH₃ phenyl | " | H | orange |
| 45 | 2-SO₃H, 4-SO₃H, 5-CH₃ phenyl | " | H | orange |
| 46 | 2-SO₃H, 5-SO₃H naphthyl (1-) with CH₃ at 2 | 4-OH, 2-CH₃, 3-SO₃H, 7-NR¹— naphthyl | CH₃ | orange |
| 47 | 2-CH₃ naphthyl-1-SO₃H | " | H | yellowish red |
| 48 | 2-SO₃H, 5-OCH₃ phenyl | " | CH₃ | yellowish red |
| 49 | " | " | C₂H₅ | yellowish red |
| 50 | 2-CH₃, 5-SO₃H, 7-SO₃H naphthyl-1-SO₃H | 4-OH, 2-CH₃, 3-SO₃H, 7-NR¹— naphthyl | H | red |
| 51 | 2-SO₃H, 5-OCH₃ phenyl | " | H | yellowish red |

TABLE 2-continued

| Ex. | D | K¹ | R¹ | Hue λmax (H₂O) |
|---|---|---|---|---|
| 52 | 2-methyl-5-ethoxybenzenesulphonic acid (SO₃H, H₅C₂O, CH₃) | 1-hydroxy-2-methyl-7-(NR¹)-naphthalene-3-sulphonic acid (OH, CH₃, HO₃S, NR¹—) | H | yellowish red |
| 53 | 2-methoxy-5-methylbenzene-1,4-disulphonic acid (SO₃H, H₃CO, HO₃S) | " | H | yellowish red |
| 54 | 2-methyl-4-methylbenzenesulphonic acid (SO₃H, H₃C) | " | H | orange |
| 55 | 5-methyl-2,4-disulphonic acid benzene (SO₃H, H₃C, HO₃S) | " | H | orange |
| 56 | 2-methylnaphthalene-1,5-disulphonic acid (SO₃H, SO₃H) | " | H | red |
| 57 | 2-methylnaphthalene-1-sulphonic acid (SO₃H) | 1-hydroxy-2-methyl-7-(NR¹)-naphthalene-3-sulphonic acid (OH, CH₃, HO₃S, NR¹—) | H | red |
| 58 | 2-methoxybenzenesulphonic acid (SO₃H, H₃CO) | " | CH₃ | yellowish red |
| 59 | 2-methoxybenzenesulphonic acid (SO₃H, H₃CO) | " | C₂H₅ | yellowish red |

EXAMPLE 60

29.6 g of 1,3-diaminobenzene-6-sulphonic acid are dissolved in 250 ml of water at pH 6.5. After addition of 0.75 g of sodium dihydrogen phosphate ×2 H₂O and 0.75 g of disodium hydrogen phosphate ×12 H₂O, 15 ml of 2,4,6trifluoropyrimidine are added dropwise. The mixture is stirred at 50° C. for 6 hours, during which the pH is maintained at 6.5 with sodium carbonate solution. After clarification using activated carbon, the dyestuff intermediate is diazotised at 0° C. with 7 ml of concentrated hydrochloric acid and 9 ml of 30% strength sodium nitrite solution, and the diazotised product is added to a previously introduced solution of 31.2 g of 1-benzoyl-amino-8-hydroxy-naphthalene-3,6-disulphonic acid, during which the pH is maintained at 7 with sodium carbonate solution. After 1 hour, the coupling reaction to give the dyestuff is complete, and the dyestuff is salted out, filtered off with suction, washed and dried at about 50° C. in vacuo. It has the following structure

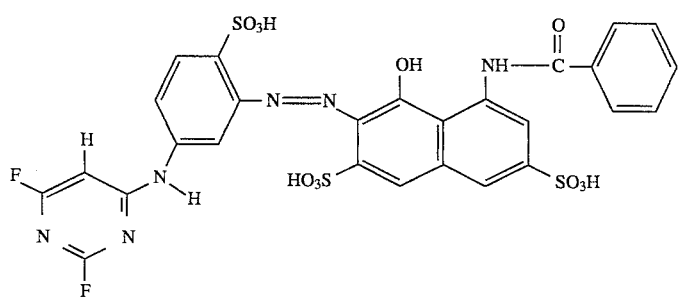

and dyes cellulose materials in a clear bluish red shade.

An alternative preparation process consists in condensing a dyestuff base of the structure

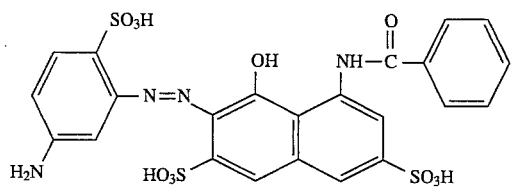

with 2,4,6-trifluoropyrimidine at pH 6–7 and 50° C.

By varying the diazo component $HD^2NH_2$ and the coupling component KH, the dyestuffs of the general formula $$F\underset{\underset{F}{\overset{N}{\diagdown}}\diagup\overset{N}{\diagup}}{\overset{H}{\diagdown}}D^2-N=N-K$$

listed in the table below, which dye cotton in red to bluish red hues, can be prepared analogously to Example 60.

TABLE 3a

| Ex. | $D^2$ | K | $R^1$ | λmax (H₂O) |
|---|---|---|---|---|
| 61 | ![SO₃H-phenyl-NR¹] | ![naphthol with OH, HN-C(O)-CH₃, HO₃S, SO₃H] | H | |
| 62 | ![SO₃H-phenyl-CH₂-NR¹] | " | H | |
| 63 | ![SO₃H-phenyl-NR¹] | " | CH₃ | |
| 64 | ![SO₃H-naphthyl-CH₂-NR¹] | " | H | |

TABLE 3a-continued

| Ex. | D² | K | R¹ | λmax (H₂O) |
|---|---|---|---|---|
| 65 | 2-methyl-4-(NR¹)-benzenesulfonic acid (SO₃H ortho to methyl) | 4-hydroxy-3-methyl-5-acetamido-naphthalene-2,8-disulfonic acid with NH-CO-CH₃ | H | |
| 66 | 2-methyl-4-(CH₂NR¹)-benzenesulfonic acid | " | H | |
| 67 | 2-methyl-4-(NR¹)-benzenesulfonic acid | " | CH₃ | |
| 68 | 2-methyl-5-(CH₂NR¹)-naphthalene-1-sulfonic acid | " | H | |
| 69 | 2-methyl-4-(CH₂NR¹)-benzenesulfonic acid | 4-hydroxy-3-methyl-5-benzamido-naphthalene-2,7-disulfonic acid with NH-CO-C₆H₅ | H | |
| 70 | 2-methyl-4-(NR¹)-benzenesulfonic acid | " | CH₃ | |
| 71 | 2-methyl-5-(CH₂NR¹)-naphthalene-1-sulfonic acid | " | H | 543 nm |

TABLE 3a-continued

| Ex. | D² | K | R¹ | λmax (H₂O) |
|---|---|---|---|---|
| 72 | [benzene with SO₃H and NR¹ substituents] | [naphthalene with OH, CH₃, HO₃S, SO₃H, and HN-C(=O)-phenyl substituents] | H | |
| 73 | [benzene with SO₃H and CH₂-NR¹ substituents] | [naphthalene with OH, CH₃, HO₃S, SO₃H, and HN-C(=O)-phenyl substituents] | H | |
| 74 | [benzene with SO₃H and NR¹ substituents] | " | CH₃ | |
| 75 | [naphthalene with SO₃H, CH₃, and CH₂-NR¹ substituents] | " | H | 512 nm |

By varying the diazo component D—NH₂ and the coupling component K¹H₂, the dyestuffs of the general formula

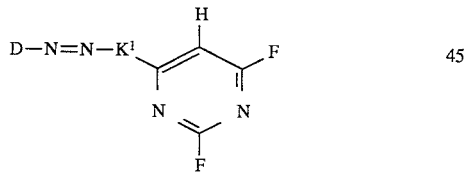

listed in the table below can be prepared analogously to Example 60. They dye cotton in red to bluish red hues.

TABLE 3b

| Ex. | D | K¹ | R¹ | λmax (H₂O) |
|---|---|---|---|---|
| 76 | [benzene with SO₃H substituent] | [naphthalene with OH, CH₃, HO₃S, SO₃H, and HN-C(=O)-phenyl-NR¹ substituents] | H | 535 nm |

TABLE 3b-continued

| Ex. | D | K¹ | R¹ | λmax (H₂O) |
|---|---|---|---|---|
| 77 | naphthalene with SO₃H at position 1 and SO₃H at position 5, methyl at position 2 | 8-hydroxy-7-methyl-6-sulfo-3-sulfo-naphthalen-1-yl with NH-C(=O)-C₆H₄-NR¹- | H | |
| 78 | 2-methylbenzenesulfonic acid (SO₃H) | same as above | CH₃ | |
| 79 | " | 8-hydroxy-7-methyl-6-sulfo-4-sulfo-naphthalen-1-yl with NH-C(=O)-C₆H₄-NR¹- | H | |
| 80 | naphthalene with SO₃H at positions 1 and 5, methyl at position 2 | " | H | |
| 81 | 2-methylbenzenesulfonic acid (SO₃H) | " | CH₃ | |

EXAMPLE 82

49.2 g of the diazotisation solution from Example 60 are metered into a solution of 82.5 g of the monoazo compound of the formula

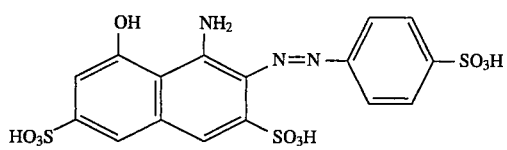

in 500 ml of water at a pH of 7 over a period of 15 to 20 minutes, during which the pH is maintained between 6 and 8 by addition of a 20% strength sodium carbonate solution. To complete the coupling reaction, stirring of the mixture at a pH of 7–8 is continued for 1 hour, and the dyestuff is then salted out by addition of 70 g of common salt. Isolation and drying gives about 150 g of a salt-containing black dyestuff powder which has the structure

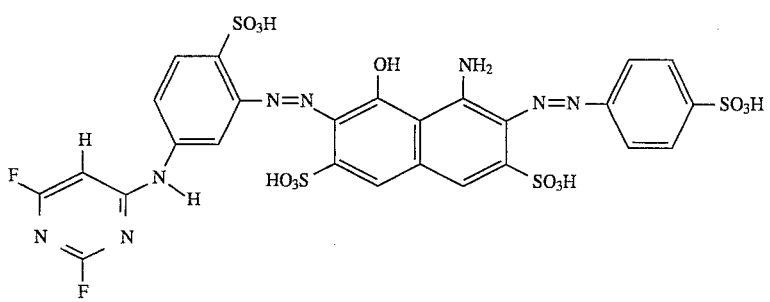

and dyes cotton in navy to black hues by the dyeing or printing processes customary for reactive dyestuffs.

This reactive dyestuff can also be prepared by condensing a solution of 133.4 g of the diazo dyestuff base of the formula

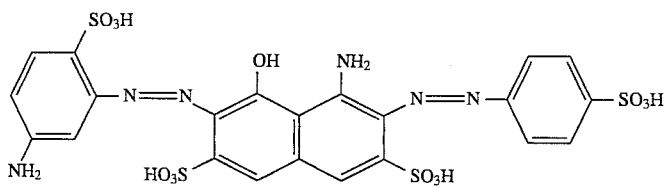

in 750 ml of water at 50° C. and a constant pH of 6–7, (addition of sodium carbonate solution) with 24 g of 2,4,6-trifluoropyrimidine and isolating the dyestuff at 20°–25° C. as described above.

Further valuable reactive dyestuffs are obtained by varying, analogously to Example 82, the diazo components as follows:

TABLE 4

| Example | Z—B—D— | D'— | Hue |
|---|---|---|---|
| 83 | (phenyl-SO₃H with Z—HN substituent) | (phenyl with HO₃S and SO₃H) | navy/black (610 nm) |
| 84 | " | (2-carboxyphenyl, HO₂C) | navy (602 nm) |
| 85 | " | (phenyl-SO₃H linked to benzothiazole with CH₃ and SO₃H) | greenish blue |

TABLE 4-continued

Structure (shown at top of table):

Z—B—D—N=N— attached to naphthalene bearing OH, NH₂, with HO₃S and SO₃H substituents, and —N=N—D'

Z = pyrimidine ring with two F substituents (difluoropyrimidinyl group)

| Example | Z—B—D— | D'— | Hue |
|---|---|---|---|
| 86 | 4-SO₃H-phenyl with Z—HN at position (Z—HN-substituted sulfophenyl) | 2-HO₃S-phenyl-5-SO₃H (disulfophenyl) | navy (611 nm) |
| 87 | " | 2-HO₃S-phenyl | navy/black (600 nm) |
| 88 | " | 4-CO₂H-phenyl | navy |
| 89 | 4-SO₃H-phenyl with Z—HN substituent | naphthyl with SO₃H groups (1,3-disulfo-6-methylnaphthyl) | greenish black |
| 90 | " | HO₃S-phenyl—N=N—phenyl—SO₃H | dark green |
| 91 | " | phenyl—N=N—(HO₃S,SO₃H-disubstituted phenyl) | " |
| 92 | Z—HN-substituted sulfophenyl (SO₃H) | 4-SO₃H-phenyl | greenish dark blue |
| 93 | " | 2-HO₃S-phenyl-5-SO₃H (disulfophenyl) | " |

TABLE 4-continued

| Example | Z—B—D— | D'— | Hue |
|---|---|---|---|
| 94 | Z—HN—(C₆H₃)(SO₃H)(CH₃)— | 3-methyl-naphthalene-1,5-disulfonic acid | greenish dark blue |
| 95 | (C₆H₃)(SO₃H)(CH₃)-CH₂-N(CH₃)-Z | —C₆H₄—SO₃H (para) | reddish navy |
| 96 | " | —C₆H₄—SO₃H (meta) | " |
| 97 | " | 3-methyl-naphthalene-1,5-disulfonic acid | navy/black |
| 98 | (C₆H₃)(SO₃H)(CH₃)-CH₂-N(CH₃)-Z | —C₆H₄—N=N—C₆H₄—SO₃H | greenish black |
| 99 | " | 6-methyl-naphthalene-1,3-disulfonic acid | navy |
| 100 | Z—N(CH₃)—CH₂CH₂—SO₂—C₆H₄— | 2-methyl-benzene-1,4-disulfonic acid (HO₃S at 1, SO₃H at 4) | navy/black |

TABLE 4-continued

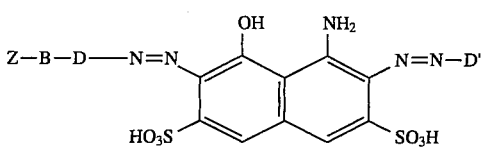

| Example | Z—B—D— | D'— | Hue |
|---|---|---|---|
| 101 | 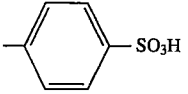 | 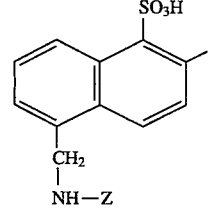 | " |
| 102 | 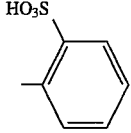 | 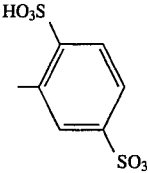 | navy/black |
| 103 | " | 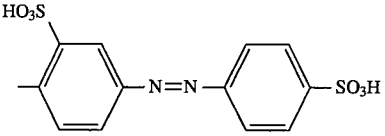 | " |
| 104 | " | 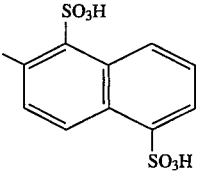 | dark greenish/black |
| 105 | " | (naphthalene with SO₃H groups) | greenish blue |

EXAMPLES 107 to 130

Dyestuffs of these examples are obtained by using in Example 82 to 105 1-amino-8-hydroxy-4,6-naphthalenedisulphonic acid instead of the coupling component 1-amino-8-hydroxy-3,6-napthalenedisulphonic acid. By way of example, Example 107 is shown in the form of a formula:

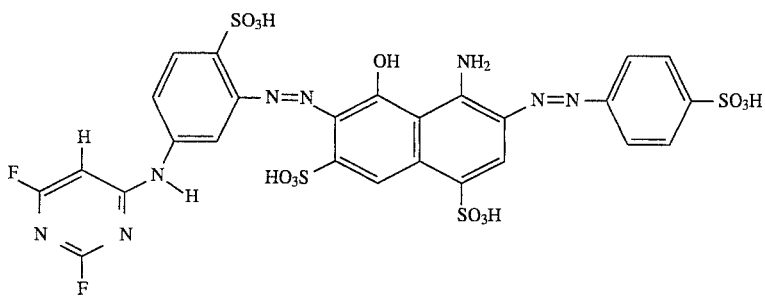

EXAMPLE 131

A solution of 52.6 g of 1-amino-8-hydroxy-3,6-naphthalenedisulphonic acid disodium salt in 250 ml of water is metered into the diazonium salt suspension of 49.2 g of the diazotisation solution from Example 60 over a period of 15 minutes. The mixture is stirred at a pH of 1.5–2.5 and a temperature of 5°–10° C. for one hour. The pH is then increased to 3.5 by slow addition of a 20% strength sodium acetate solution, and the mixture is stirred at this pH at 10° to 20° C. for another 3 hours. After coupling is complete, the pH is brought to 7.5 with 20% strength sodium carbonate solution.

The mixture of a diazonium salt obtained by diazotisation of 47.1 g of 2-amino-1,5-naphthalenedisulphonic acid monosodium salt is added to this red coupling solution over a period of 30 minutes, during which the pH is maintained in the range from 6.5 to 8.0 by addition of 20% strength sodium carbonate solution. The mixture is stirred at a pH of 7–8 for another 2 hours, and the product is salted out with a sufficient amount of potassium chloride. The precipitated dyestuff is isolated by filtering it off with suction and dried. The black dyestuff powder, which has the structure

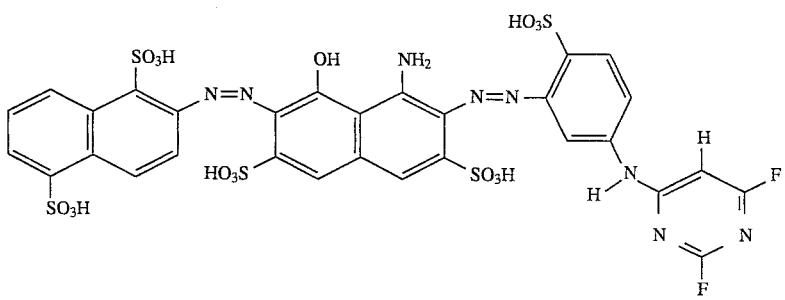

dyes cotton in navy to black hues.

The reactive dyestuff can also be prepared by condensation of 2,4,6-trifluoropyrimidine with the disazo dye-stuff base of the formula

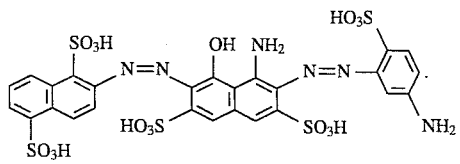

By varying the fibre-reactive and also the non-fibre-reactive diazo component, further interesting reactive dyestuffs can be synthesised analogously to Example 131:

TABLE 5

Structure:
D—N=N—[naphthalene with OH, NH₂, two SO₃H]—N=N—D'—B—Z $$Z = \text{pyrimidine with 2-F, 5-F, =CH-}$$

| Example | —D | —D'—B—A | Hue |
|---|---|---|---|
| 132 | 2-sulfophenyl (SO₃H ortho) | 4-(NH—Z)-2-methylphenyl with HO₃S at 5-position | navy (606 nm) |
| 133 | 4-sulfophenyl | " | navy (608 nm) |
| 134 | 2-carboxyphenyl | " | navy |
| 135 | 2-sulfo-5-methylphenyl | " | navy |
| 136 | 2-(6-methyl-7-sulfobenzothiazol-2-yl)-4-sulfophenyl | " | greenish black |
| 137 | 4'-sulfo-2-methyl-4-(phenylazo)phenyl with HO₃S on distal ring | 4-(NH—Z)-2-methylphenyl with HO₃S | greenish black |
| 138 | 3-methyl-6,7-disulfonaphthalen-2-yl | " | greenish navy |
| 139 | 3,6,8-trisulfonaphthalen-2-yl | " | greenish navy |
| 140 | 2-sulfonaphthalen-1-yl | 2-methyl-4-sulfo-5-(NH—Z)-phenyl with SO₃H | navy |

TABLE 5-continued

Structure: D—N=N— on [OH, SO3H, HO3S naphthalene] —N=N—D'—B—Z; amino group; Z = fluoropyrimidinyl group

| Example | —D | —D'—B—A | Hue |
|---|---|---|---|
| 141 | 2-methylphenyl-SO₃H | phenyl with SO₃H, SO₃H, NH—Z | navy |
| 142 | naphthyl-1,5-disulfonic acid (2-methyl) | phenyl with SO₃H, NH—Z | greenish blue |
| 143 | 2-methylphenyl-SO₃H | " | greenish blue |
| 144 | 2-methylnaphthyl-1-SO₃H | phenyl with SO₃H, NH—Z, SO₃H | greenish blue |
| 145 | 2-methylphenyl-SO₃H | " | greenish blue |
| 146 | naphthyl-1,5-disulfonic acid (2-methyl) | phenyl with SO₃H, CH₂—N(CH₃)—Z | navy |
| 147 | 2-methylphenyl-SO₃H | " | navy |
| 148 | 2,5-dimethylphenyl-SO₃H (with CH₃) | " | navy |

TABLE 5-continued

Structure: D—N=N— attached to naphthalene bearing OH, NH₂, HO₃S, SO₃H, with —N=N—D'—B—Z Z = pyrimidine with two F substituents (difluoropyrimidinyl group)

| Example | —D | —D'—B—A | Hue |
|---|---|---|---|
| 149 | 5-Cl, 2-SO₃H phenyl | " | navy |
| 150 | HO₃S-C₆H₄-N=N-C₆H₃(SO₃H)- | HO₃S-C₆H₃-CH₂-N(CH₃)-Z | dark green |
| 151 | 2-SO₃H phenyl | " | navy / black |
| 152 | 2,5-di-SO₃H phenyl | " | navy / black |
| 153 | 2-(1,5-disulfo)naphthyl | " | greenish navy |
| 154 | 2-(1,5-disulfo)naphthyl | 2-(1-sulfo-5-CH₂NH—Z)naphthyl | greenish navy |
| 155 | 2-SO₃H phenyl | " | greenish navy |
| 156 | 4-CH₃O, 2-SO₃H phenyl | " | greenish black |

TABLE 5-continued

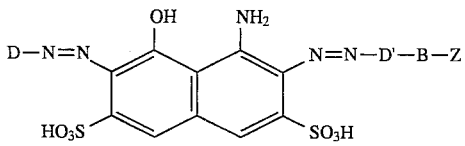

| Example | —D | —D'—B—A | Hue |
|---|---|---|---|
| 157 | 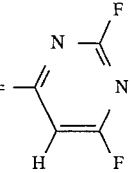 | 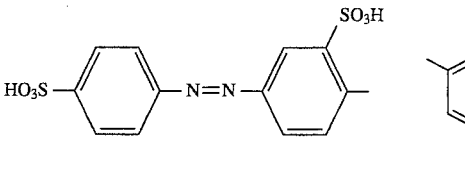 | dark green |
| 158 | 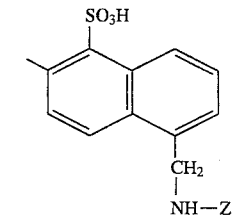 | 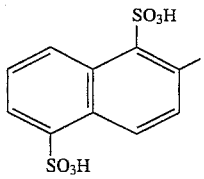 | navy |
| 159 | 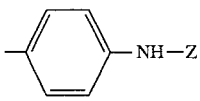 | 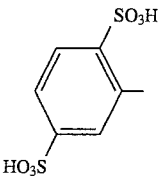 | greenish black |
| 160 | 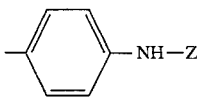 | 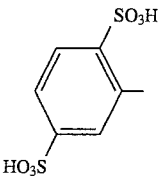 | greenish black |

EXAMPLES 161 to 190

Dyestuffs of these examples are obtained by using in Example 131 to 160 1-amino-8-hydroxy-4,6-naphthalenedisulphonic acid instead of the coupling component 1-amino-8-hydroxy-3,6-napthalenedisulphonic acid. The hues of Examples 161 to 190 are all somewhat more reddish on cotton than the analogous dyestuffs 131 to 160, such as, for example, Example 161:

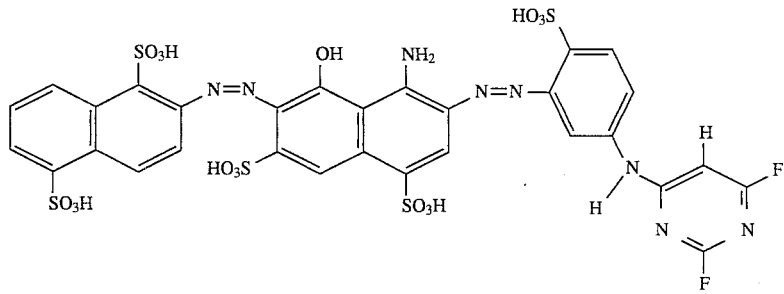

(somewhat more reddish than Example 131).

EXAMPLE 191

15.4 g of 2,4,6-trifluoropyrimidine are introduced into a neutralised solution of 41.9 g of 1-amino-4-(3'-amino-2'-methyl-5'-sulphophenylamino)-anthraquinone in 500 ml of water. While maintaining the pH at 6–7 with sodium carbonate solution, the mixture is stirred at 40°–50° C. until condensation is complete. The dyestuff is salted out with sodium chloride, filtered off with suction and washed with 10% strength sodium chloride solution. The blue powder obtained after drying at 40° C in vacuo has the formula:

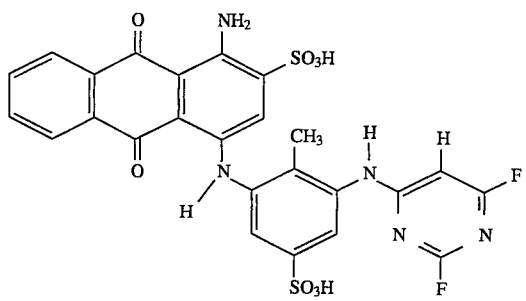

and dyes cotton in neutral blue shades (λmax 592 nm (H₂O)).

EXAMPLE 192

The procedure of Example 191 is repeated, using 21 g of 1-amino-4-(3'-amino-4'-sulphophenylamino)-anthraquinone-2-sulphonic acid, giving a dyestuff of the formula

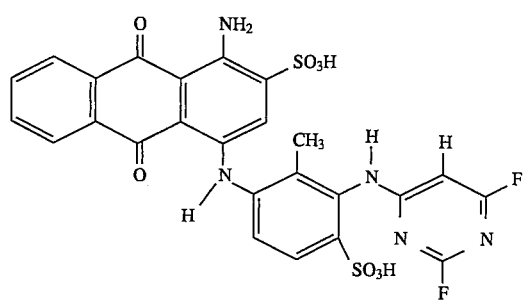

which dyes cotton in blue hues (λmax=596 nm (H₂O)).

EXAMPLES 193 to 211

If the aminoazo compounds listed in Table 6 below are reacted at pH 5–8 and temperatures of 40°–60° C. with 2,4,6-trifluoropyrimidine, dyestuffs are obtained which dye cotton in the hues given.

TABLE 6

| Ex. | Aminoazo compound | Hue | λmax (H₂O) |
|---|---|---|---|
| 193 | | deep red | |
| 194 | | deep red | |
| 195 | | deep red | |
| 196 | | deep red | |
| 197 | | deep red | |

TABLE 6-continued

| Ex. | Aminoazo compound | Hue | λmax (H₂O) |
|---|---|---|---|
| 198 | | deep red | |
| 199 | | deep red | |
| 200 | | deep red | |
| 201 | | deep red | |
| 202 | | deep red | |
| 203 | | deep red | |
| 204 | | deep red | |

TABLE 6-continued

| Ex. | Aminoazo compound | Hue | λmax (H$_2$O) |
|---|---|---|---|
| 205 | (structure) | deep red | |
| 206 | (structure) | red-violet | |
| 207 | (structure) | deep red | |
| 208 | (structure) | deep red | |
| 209 | (structure) | blue | 592 nm |
| 210 | (structure) | blue | |

TABLE 6-continued

| Ex. | Aminoazo compound | Hue | λmax (H₂O) |
|---|---|---|---|
| 211 | (structure) | navy | |

EXAMPLES 212 to 217

If the aminoazo compounds listed in Table 7 below are reacted in a known manner with equimolar amounts of hydrogen peroxide and copper sulphate and the dyestuff bases formed are condensed to pH 5 to 8 and 40° to 60° C. with 2,4,6-trifluoropyrimidine, copper complex dyestuffs are obtained which dye cotton in the hues given, for example from the aminoazo compound from Example 212 the dyestuff of the formula

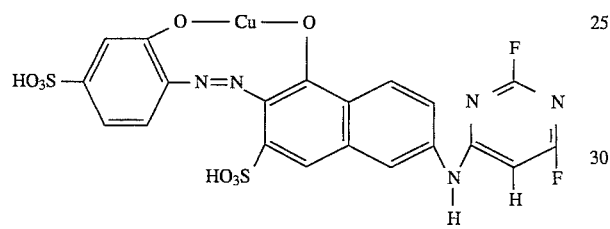

is obtained.

TABLE 7

| Ex. | Aminoazo compound | Hue | λmax (H₂O) |
|---|---|---|---|
| 212 | (structure) | deep red | |
| 213 | (structure) | deep red | |
| 214 | (structure) | deep red | |
| 215 | (structure) | deep red | |

TABLE 7-continued
| Ex. | Aminoazo compound | Hue | λmax (H₂O) |
|---|---|---|---|
| 216 | | blue | |
| 217 | | navy | 560 nm |
EXAMPLES 218 to 222
If the corresponding dyestuff bases are reacted with 2,4,6-trifluoropyrimidine at pH 5–8 and 40°–60° C., the following dyestuffs are obtained, which dye cotton in the hues given:
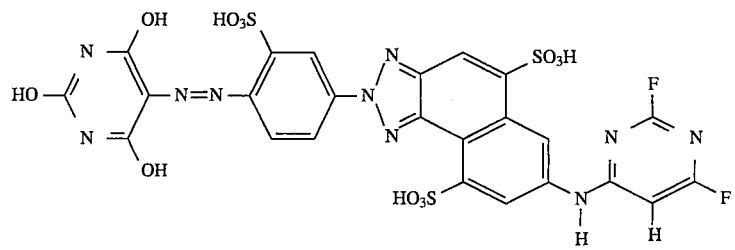
218
yellow, λmax = 415 nm (H₂O)
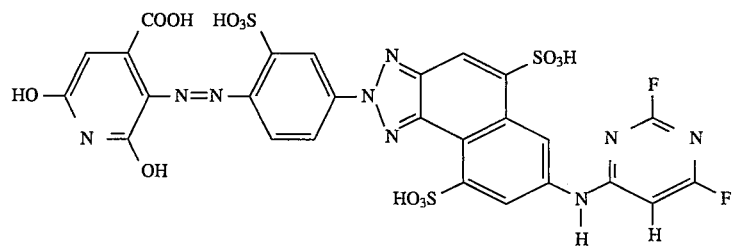
219
yellow, λmax = 443 nm (H₂O)
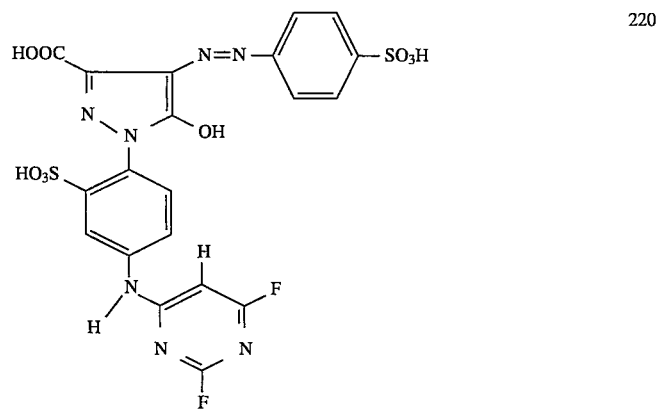
220

-continued
yellow, λmax = 432 nm (H₂O)

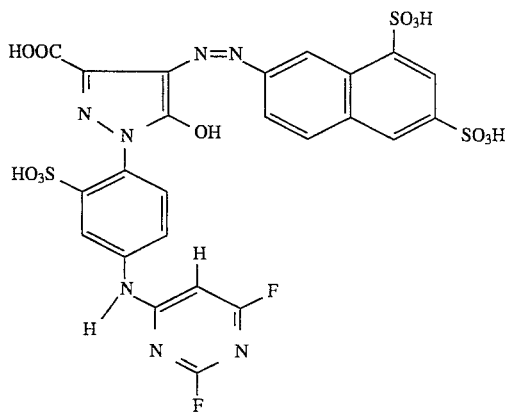

221 golden yellow, λmax = 448 nm (H₂O)

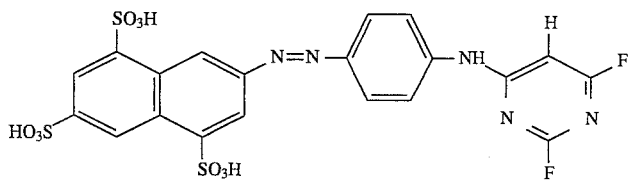

222 orange, λmax = 399 nm (H₂O)

We claim:

1. In the dyeing or printing of a material of OH— or synthetic amido-containing material using at least one reactive dyestuff, the improvement wherein said reactive dyestuff comprises a reactive dyestuff which, in the form of the free acid has the formula (I)

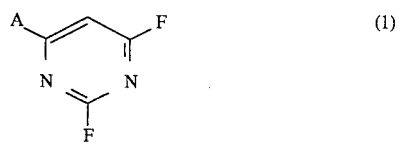  (1)

in which

A is a chromophoric radical of one of the following structures

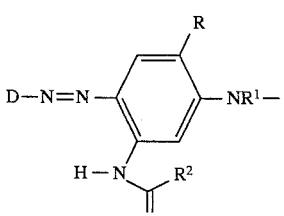  (2)

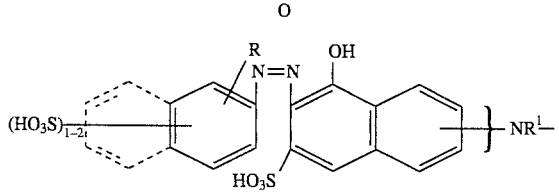  (3)

-continued

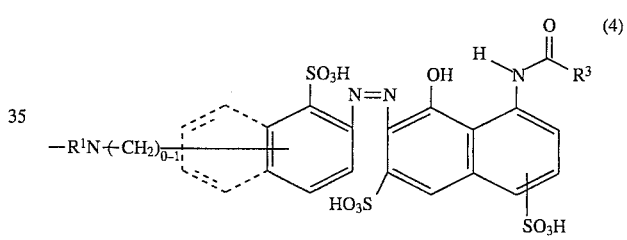  (4)

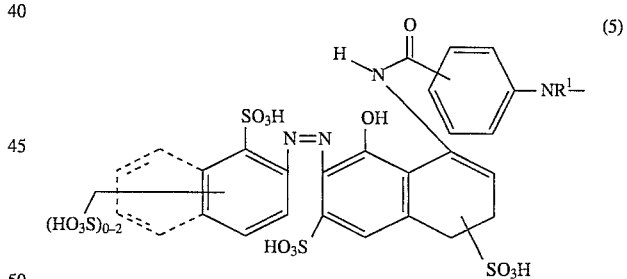  (5)

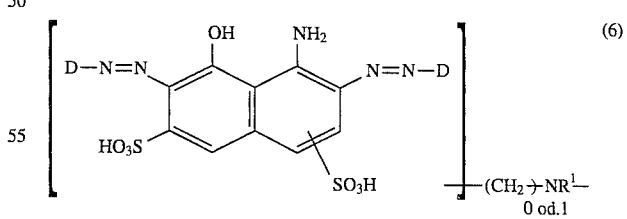  (6)

-continued

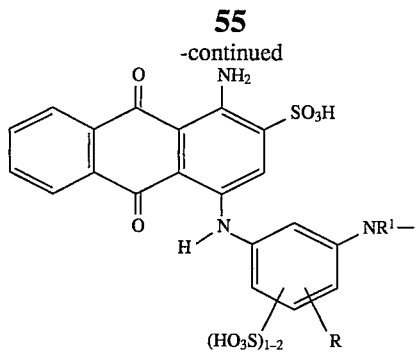
(7)

or a metal complex of dyestuffs of the formulae (8)–(11)

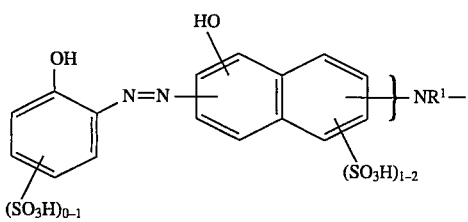
(8)

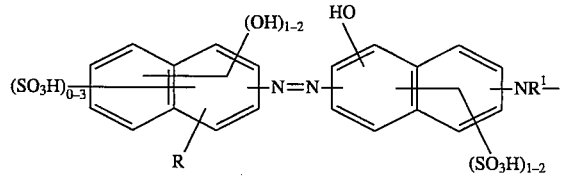
(9)

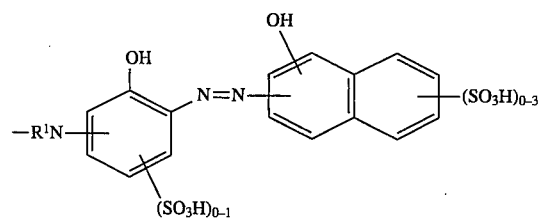
(10)

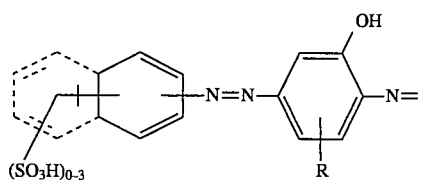
(11)

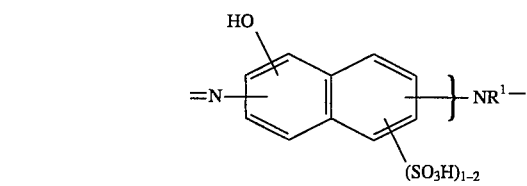
(12)

-continued

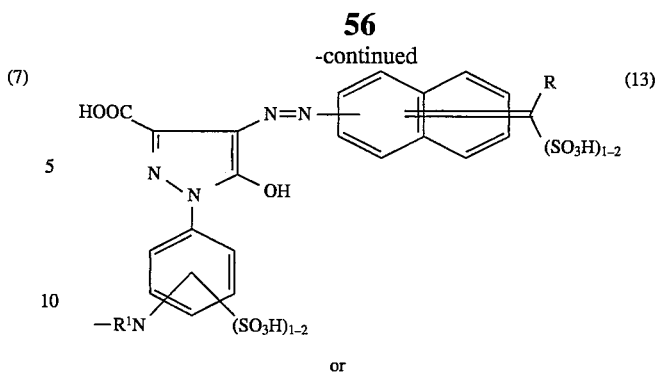
(13)

or

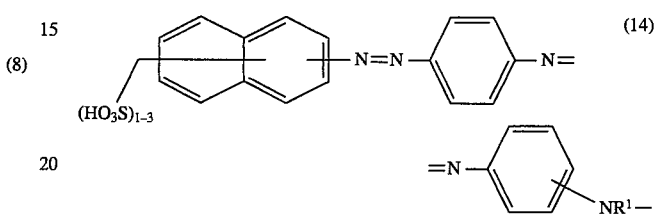
(14)

in which the bond between the chromophoric radical A and the 4-pyrimidinyl radical is effected via an amino or aminomethyl function on a ring C atom and A, in which R denotes H, a $C_1$–$C_6$-alkyl radical, a $C_1$–$C_6$-alkoxy radical, $R^1$ denotes H, $CH_3$, $C_2H_5$, $R^2$ denotes $NH_2$, a $C_1$–$C_4$-alkyl radical which is unsubstituted or substituted by OH, $SO_3H$, $OSO_3H$ or $CO_2H$, a $C_1$–$C_4$-alkoxy radical which is unsubstituted or substituted by OH, $SO_3H$, $OSO_3H$ or $CO_2H$, $R^3$ denotes a $C_1$–$C_4$-alkyl radical which is unsubstituted or substituted by OH, $SO_3H$, $OSO_3H$ or $CO_2H$, a phenyl radical which is unsubstituted or substituted by $C_1$–$C_4$-alkyl, halogen or $SO_3H$, D represents a sulpho- or carboxy-containing radical of a diazo component from the benzene, naphthalene or hetaryl series, which additionally may be substituted by alkyl, alkoxy, carboxyl or halogen radicals. In formula (6) one of the two radicals D contains an optionally substituted 2,6-difluoro-4-pyrimidinylamino, -methylamino or -ethylamino substituent, it being possible in this case for D to be free of sulpho groups or to contain sulpho groups.

K represents a coupling component, with the exception of compounds 15 and 16

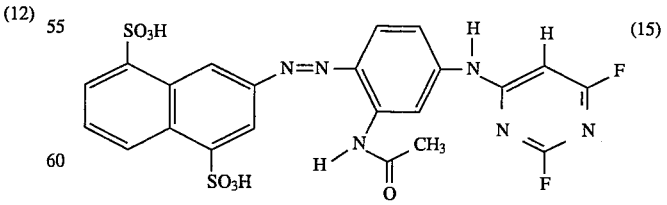
(15)

which are described by F. Lehr in Dyes+Pigments 14 (1990), 239–63.

2. The method according to claim 1, wherein K is a pyridone, pyrazolone, barbituric acid or citrazinic acid derivative.

3. The method according to claim 1, wherein A is a radical of the formula 2 to 12, in which R is H, $CH_3$, $OCH_3$, $OC_2H_5$, $R^1$ is H, $CH_3$, and $R^2$ is $NH_2$, a $C_1$–$C_4$-alkyl radical which is unsubstituted or substituted by OH, $SO_3H$, $OSO_3H$ or $CO_2H$.

4. The method according to claim 1, where in the reactive dyestuff a) A is a radical of the formula (2), in which
R is H,
$R^1$ is H,
$R^2$ is $NH_2$, a $C_1$–$C_4$-alkyl radical which is unsubstituted or substituted by OH, $SO_3H$, $OSO_3H$ or $CO_2H$, and
D is b) A is a radical of the formula (3), in which
R is H, $CH_3$, $OC_2H_5$, and
$R^1$ is H, or c) A is a radical of the formulae (4)–(5), in which
$R^1$ is H, and $R^3$ is $CH_3$, a phenyl radical which is unsubstituted or substituted by $C_1$–$C_4$-alkyl, halogen or $SO_3H$, or d) A is a radical of the formula in which D is $D^1$ is $R^1$ is H, and n=m is 0 or 1 but n+m is 1, or e) A is a radical of the formula in which
R is H, $CH_3$, $OCH_3$, and
$R^1$ is H, or f) A is a radical of the formulae (8) to (11), in which R is H, or g) A is a radical of the formula (12), in which
R is H and
K has the abovementioned meaning.

5. The method according to claim 1, wherein the reactive dyestuff is

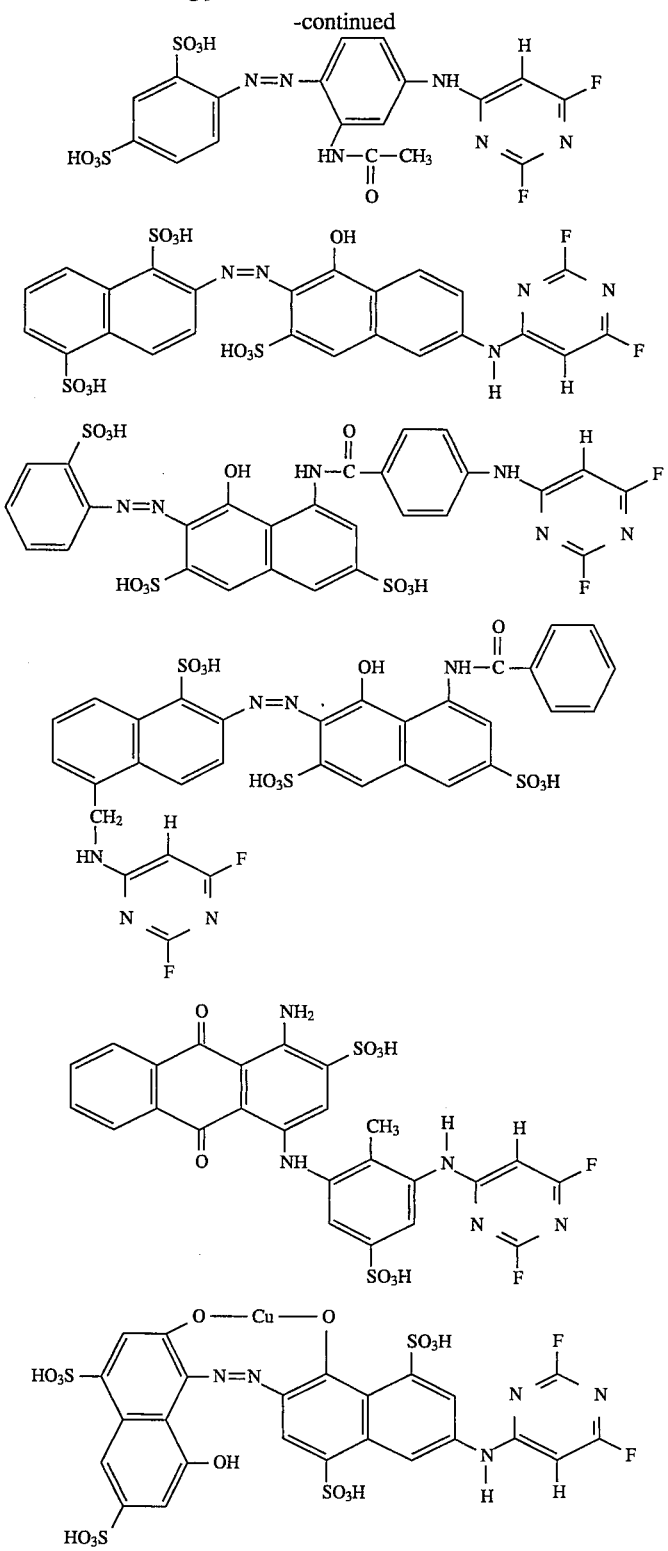

-continued
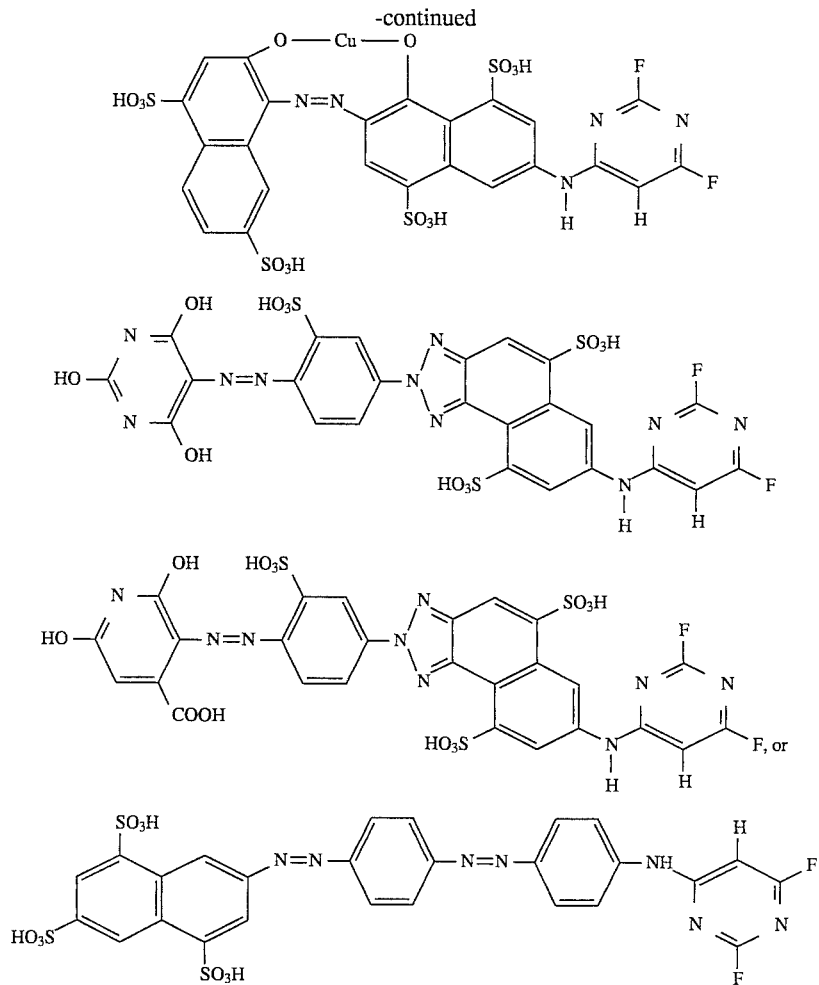
6. Dyed fabric produced by the process of claim 1.
* * * * *

UNITED STATES PATENT AND TRADEMARK OFFICE
CERTIFICATE OF CORRECTION

Page 1 of 2

PATENT NO. : 5,538,518
DATED : July 23, 1996
INVENTOR(S) : Reddig, et al.

It is certified that error appears in the above-indentified patent and that said Letters Patent is hereby corrected as shown below:

Col. 59, line 1   Delete " 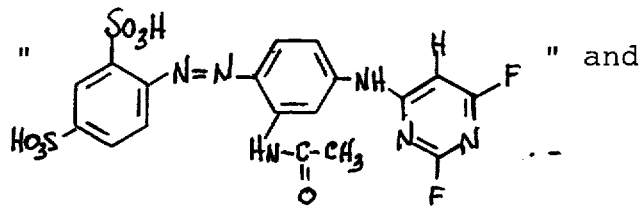 " and substitute

-- 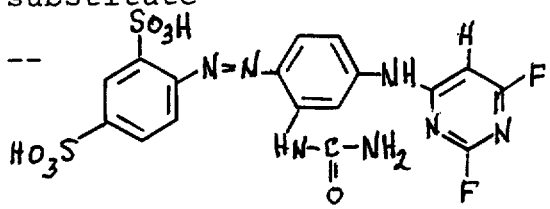 --

Col. 61, line 3   Delete " 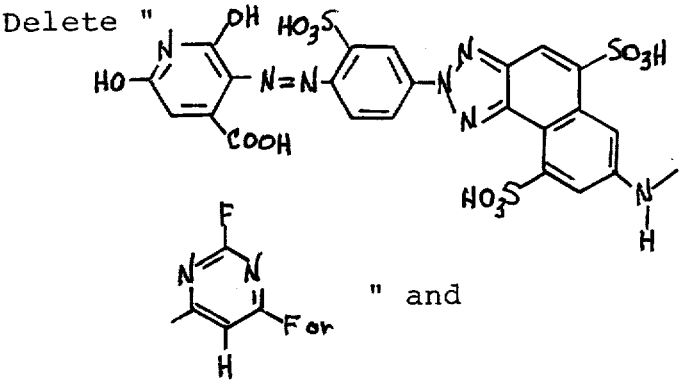 " and

UNITED STATES PATENT AND TRADEMARK OFFICE
CERTIFICATE OF CORRECTION

Page 2 of 2

PATENT NO.   : 5,538,518
DATED        : July 13, 1996
INVENTOR(S)  : Reddig, et al.

It is certified that error appears in the above-indentified patent and that said Letters Patent is hereby corrected as shown below:

Col. 61, line 3 Cont'd    substitute

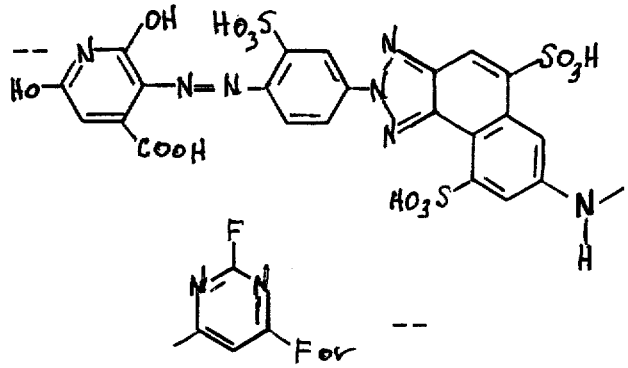

Signed and Sealed this

Ninth Day of September, 1997

Attest:

BRUCE LEHMAN

Attesting Officer    Commissioner of Patents and Trademarks